United States Patent [19]
Morris

[11] Patent Number: 5,953,679
[45] Date of Patent: Sep. 14, 1999

[54] METHOD FOR RECOVERY AND SEPARATION OF TRINITROTOLUENE BY SUPERCRITICAL FLUID EXTRACTION

[75] Inventor: Jeffrey B. Morris, Perryville, Md.

[73] Assignee: The United States of America as represented by the Secretary of Army, Washington, D.C.

[21] Appl. No.: 08/840,779

[22] Filed: Apr. 16, 1997

[51] Int. Cl.⁶ ...................................................... A62D 3/00
[52] U.S. Cl. ............................................................ 588/202
[58] Field of Search ............................................. 588/202

[56] References Cited

PUBLICATIONS

C. Wujcik et al, Supercritical Fluid Extraction of 2,4, 6–Trinitrotoluene and 1,3,5–Trinitrobenzene From Soil, 1996, J. Environ, Sci. Health, Part A: Environ. Sci. Eng. Toxic Hazard, A31(6), pp. 1361–1377.

*Primary Examiner*—Ngoclan Mai
*Attorney, Agent, or Firm*—Paul Cloahn; Muzio B. Roberto; U. John Biffoni

[57] ABSTRACT

A method for the extraction of TNT from high explosves comprising the contacting the explosive with a supercritical fluid at a temperature above the meltng point of TNT and recovering the TNT.

8 Claims, 6 Drawing Sheets

METHOD FOR RECOVERY AND SEPARATION OF TRINITROTOLUENE BY SUPERCRITICAL FLUID EXTRACTION

Rights of The Government

The invention described herein nay be manufactured, used and licensed by or for the Government without the payment to me of any royalties thereon.

BACKGROUND OF INVENTION

1. Field of Invention

The invention relates to a method for the extraction of trinitrotoluene (TNT) from high explosives through the use of supercritical fluid carbon dioxide

2. Brief description of the Prior Art

Many military high explosives formulations, based on 2,4,6 - Trinitrotoluene (TNT) are used in a variety of military ordnance applications, such as bursting charges for projectile warheads or land mines. Until recently, the routine method for the demilitarization of high explosive ordnance was open burning and open detonation. The current emphasis on environmentally —friendly technologies restricts the use of open burning and open detonation.

Other alternatives to open burning and open detonation of TNT —based high explosives include melt—out and steam —out of the explosive from the projectile casing. The recovered high explosive from these melting operations is suitable for recasting as low value commercial biasing agents.

While melt —out and steam —out avoid the problems associated with open burning and open detonation, they do not result in separation of the TNT from the filler. The majority of the recently developed methods for the demilitarization of high explosive ordnances rely on destruction of the high explosive rather than recycling.

Furthermore, the primary goal of the present method can be either removal of the TNT or the recovery of other value-added ingredients, depending on the high explosive formulation.

The present invention provides a method for the extraction and removal of TNT from high explosives formulations that does not require the use of traditional organic solvents, The super-critical carbon dioxide is more selective than organic liquid solvents in the separation of TNT from organic high explosive fillers such as cyclotrimethylenetrinitramine (RDX) and cyclotetramethylenetetranitramine (HMX).

SUMMARY OF INVENTION

Most chemically pure materials can exist in any of three well defined physical states, or phases: solids, liquids or gases. The transition equilibrium curves separate the regions of solids, liquids and gas. Of particular interest is the liquid-gas equilibrium curve which terminates abruptly at the critical point. The temperature and pressure at the critical-point are defined as the critical temperature (TC) and critical pressure (PC). The critical parameters for carbon dioxide are Tc =304.19K (31.04 C) and Pc =7.38 MPa. A superaritical fluid results when the temperatures and pressures of the materials are greater than their critical parameters.

The invention specifically addresses TNT-based explosives which include Comp B, Camp B3, Octol, Tritonal, and Torpex. For effective extraction of TNT, I operate at pressures of about 37.4MPa, and temperature of about 65 to about 85 degrees C. All extractions were carried out using a supercritical fluid. One of the unobvious features of my invention is the effect of the use of hot supercritical carbon dioxide to melt the TNT, which melts at around 81 degrees centigrade. Under supercritical conditions, melting of the TNT increases the efficiency of the extraction process. By carrying out the extraction at higher temperatures, significantly less amounts of supercritical fluids are required.

OBJECTS OF THE INVENTION

It is an object of the invention to provide and disclose a method for the extraction of TNT from a high explosive.

It is a further object of the invention to provide and disclose an environmentally friendly method for the disposal of military high explosives.

It is a further object of the present invention to provide and disclose a method for the extraction of TNT from a high explosive encased in a round.

Other objects and a fuller understanding of the invention may be had from the following description and claims.

BRIEF DESCRIPTION OF DRAWINGS

Referring now to FIG. 2 of the drawings, there is shown a schematic of the present system used to carry out the invention. Transfer lines 10 between the components of the system of FIG. 2 consist of a 1/8"cuter diameter stainless steel tubing.

Figure 1:
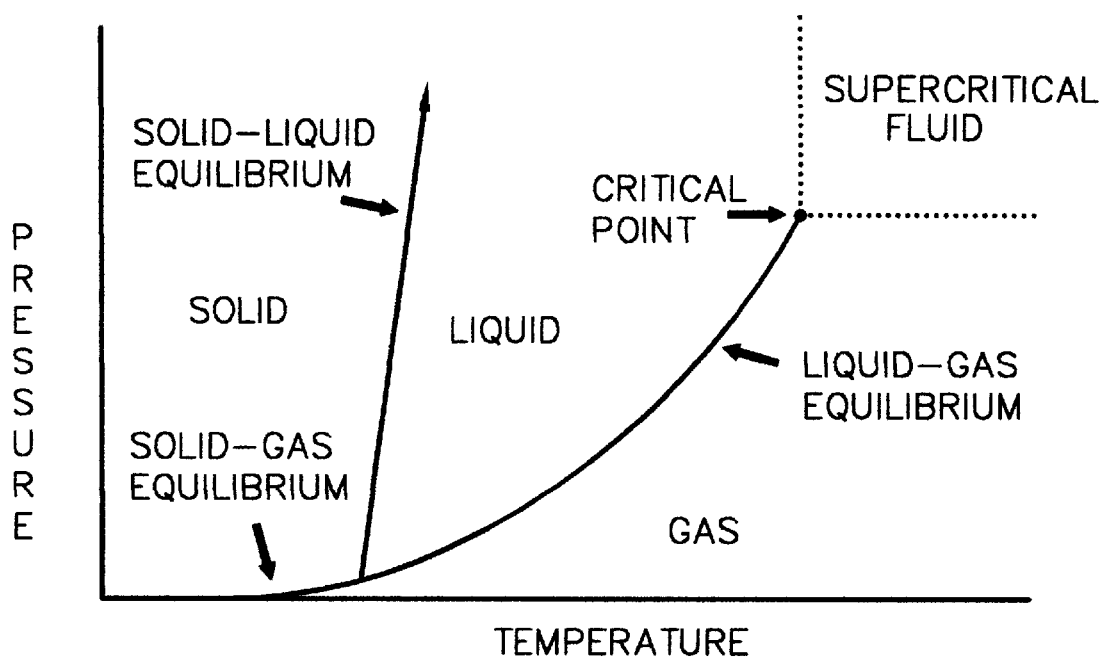
FIG. 1 is a phase diagram of a representative chemically—pure material.
Figure 2:
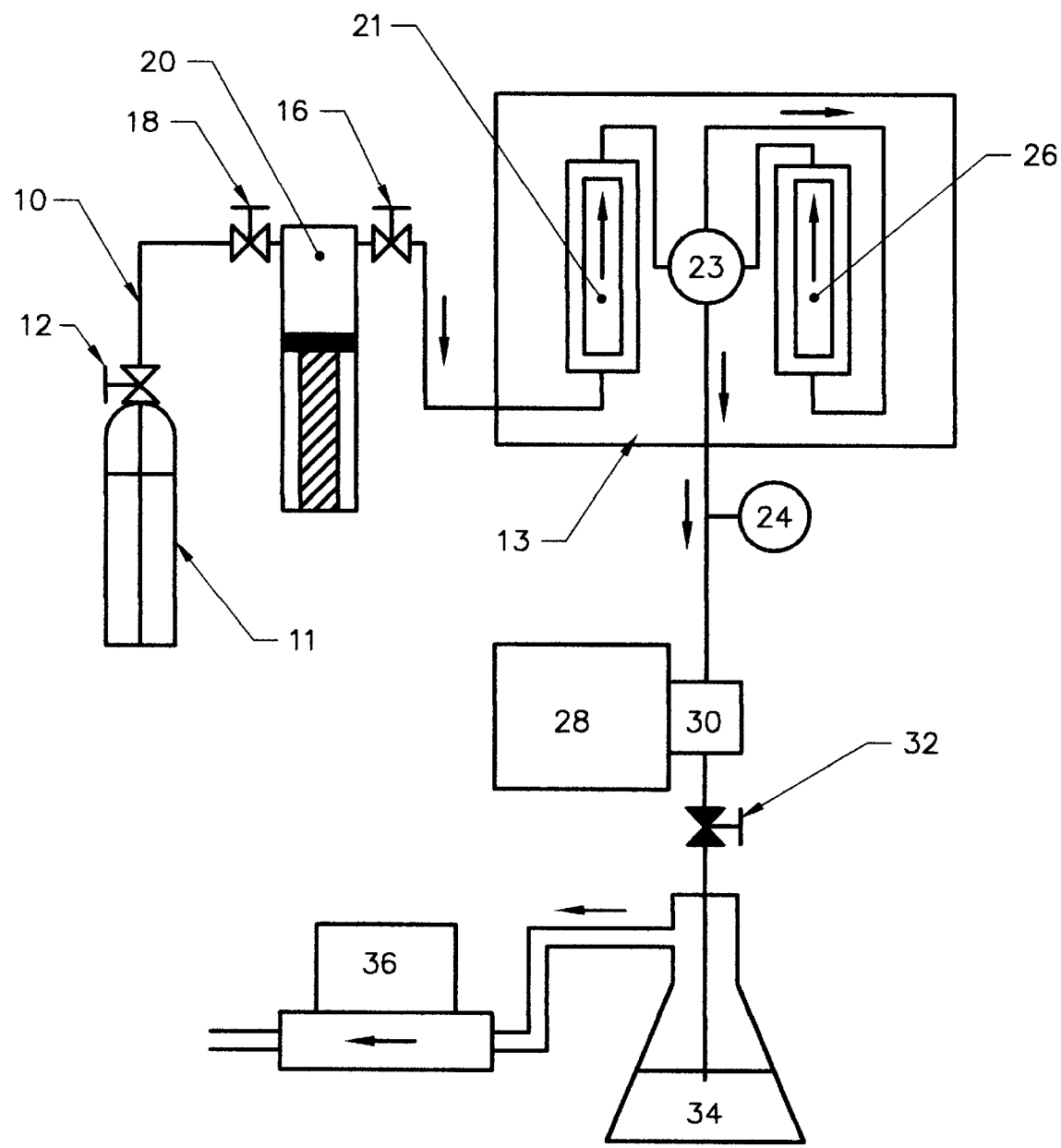
FIG. 2 is a schematic of a system used in carrying out the present invention.

In operation, liquid Carbon dioxide stored in storage tank 11 is introduced into extractor unit 13 through valves 12, 16 and 18 by syringe pump 20. The pump is used to bring the liquid carbon dioxide to operating pressures. The liquid carbon dioxide is heated to operating temperature in vessel 21, prior to entry thereof through by-pass valve 23 into extraction vessel 26. The explosive to be treated is positioned in the extraction vessel.

The carbon dioxide gas, at proper pressure and temperature enters the bottom of the extractor vessel and exits at the bottom of bypass valve 23.

Pressure gauge 24 is positioned downstream of the extractor to measure the carbon dioxide pressure at a second point away from syringe pump 20.

UV detector 28 and micro flow cell 30 are used only when making on-line UV determinations as to the solute levels in the carbon dioxide flow. The carbon dioxide flow is reduced at flow restrictor 32. As the pressure drops, the carbon dioxide becomes a gas at ambient temperatures, and any dissolved solute nucleates and is collected in collection vessel 34. The expanded carbon dioxide gas flows into the mass flow meter 36, which is used to determine the amount of carbon dioxide used in the extraction process.

EXAMPLE 1

A 292 mg. sample of a 50:50 % mix of TNT and RDX powders was placed in a 7.5 ml extraction vessel. The syringe pump 20 was charged with 210 grams of CO2. An extraction temperature of 50 degrees C and pressure of 13.6 mpa were maintained. The entire mass of CO2 was allowed to pass through the extraction apparatus and into the collection vessel. The extracted TNT was collected without the use of a collection solvent.

Figure 3:
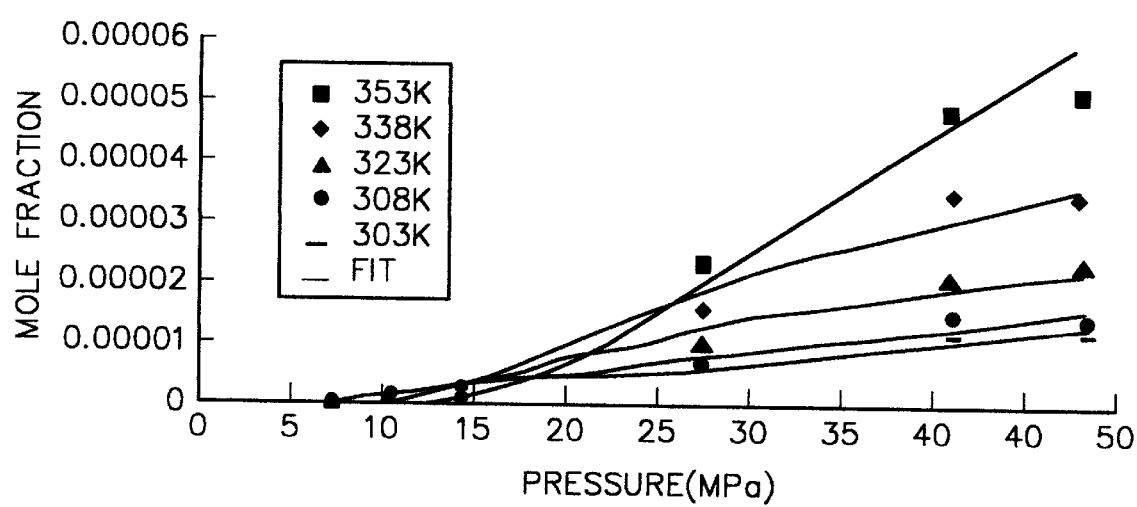
FIG. 3 is a graph showing the solubility of RDX in supercritical fluid carbon dioxide as a function of temperature and pressure.
Figure 4:
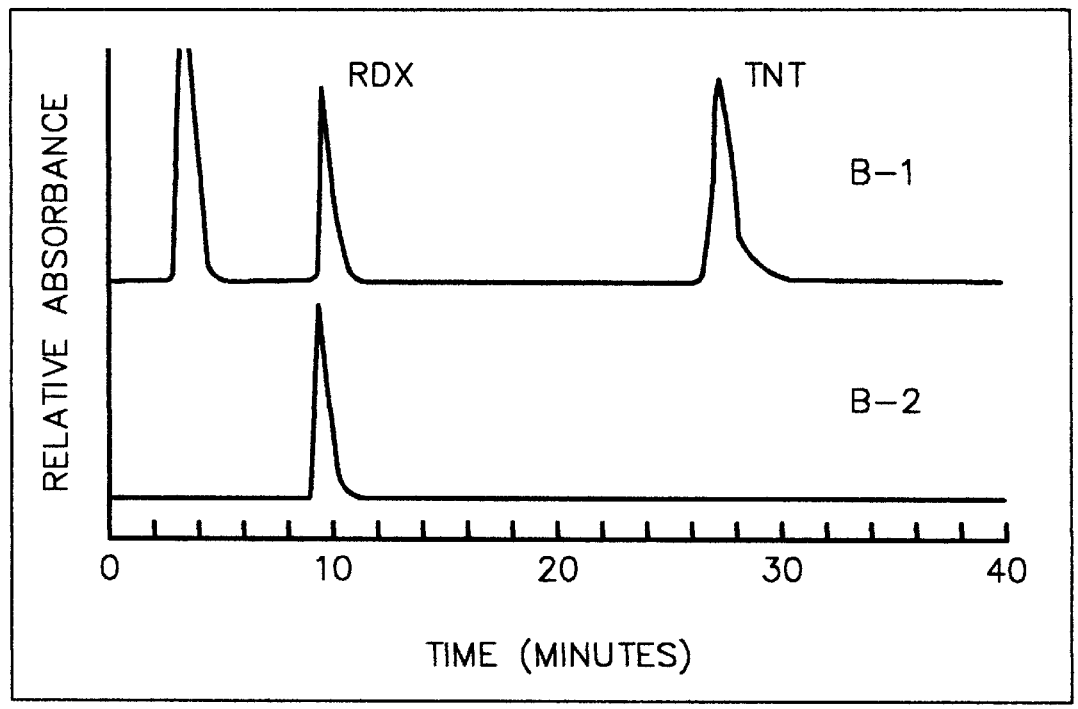
FIG. 4 is a High Performance Liquid Chromatography (HPLC) of a 50:50 mix of RDX and TNT powder before extraction (B-1) and after extraction (B-2) with, respectively supercritical fluid carbon dioxide at a temperature of 50 degrees Centigrade and a pressure of 13.6 MPa.
Figure 5:
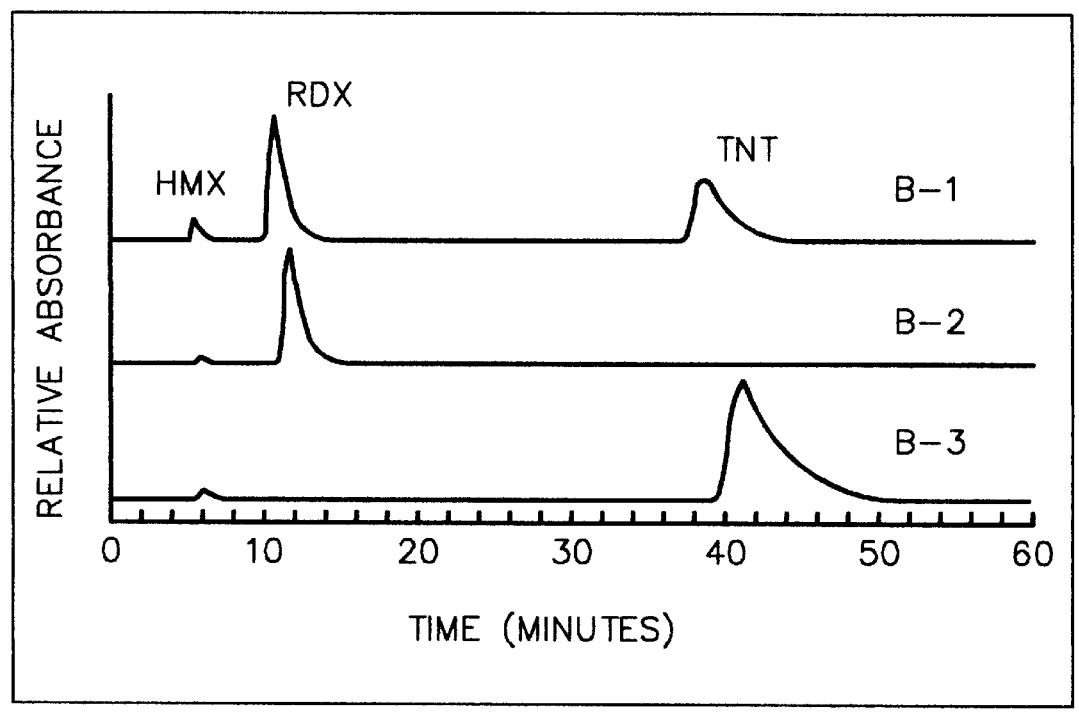
FIG. 5 is a HPLC chromatograms of Comp. B High Explosive (B-1), recovered nitramine crystals (B-2), and extracted TNT (B-3). Supercritical fluid carbon dioxide extraction was carried out at a pressure of 85 degrees centigrade and 37.4 MPa

Solutions were made from a sample of the unreacted RDX/TNT mix, and from the material recovered from the extraction vessel and collection vessel following the extractions. HPLC analyses were performed on these three solutions. The upper trace (B-1) in FIG. 4 shows the HPLC chromatogram of the unextracted mix. The lower trace(B-2) in FIG. 4 shows the HPLC chromatogram of the material remaining behind in the extraction vessel 26 following the extraction. This material is greater than 99% RDX. while not shown, results from the HPLC analysis of the material removed from the collection vessel 34 indicate a TNT content of almost 99%. Mass balance calculation on the results from the HPLC analyses indicate that 2.4 mg of RDX were extracted with 143.6 mg of TNT. The amount of RDX extracted is consistent with the RDX solubility indicated in FIG. 3.

EXAMPLE 2

Composition B consists of 36 % TNT 63% RDX, and 1% wax. Billets of Composition B with 1/41"diameter were prepared from Composition B flakes. The material was extracted in accordance with Example 1 above. For each run, a billet with a mass in the range of 150 mg to 700 was loaded into an extraction vessel. Extraction runs were carried out under conditions listed in TABLE 1.

TABLE 1

| temp (k) | Temp. (C) | Press. (MPa) | CO2 flow rate (mi/minute) | grams CO2 per gram Comp B |
|---|---|---|---|---|
| 358 | 85 | 37.4 | 1.5 | 144 |
| 338 | 65 | 37.4 | 1.3 | 276 |

In the above runs, a majority of the TNT was removed and unextracted nitramine recovered as a crystalline powder. Extraction attempted at solvent feed ratios in range the range of 130 –151 grams of carbon dioxide per gram of Composition B were only effective when the temperature was raised above the TNT melting point of 354K. A liquid or molten state allows more effective penetration and mixng of the extraction solvent with the high explosive.

EXAMPLE 3

Figure 6:
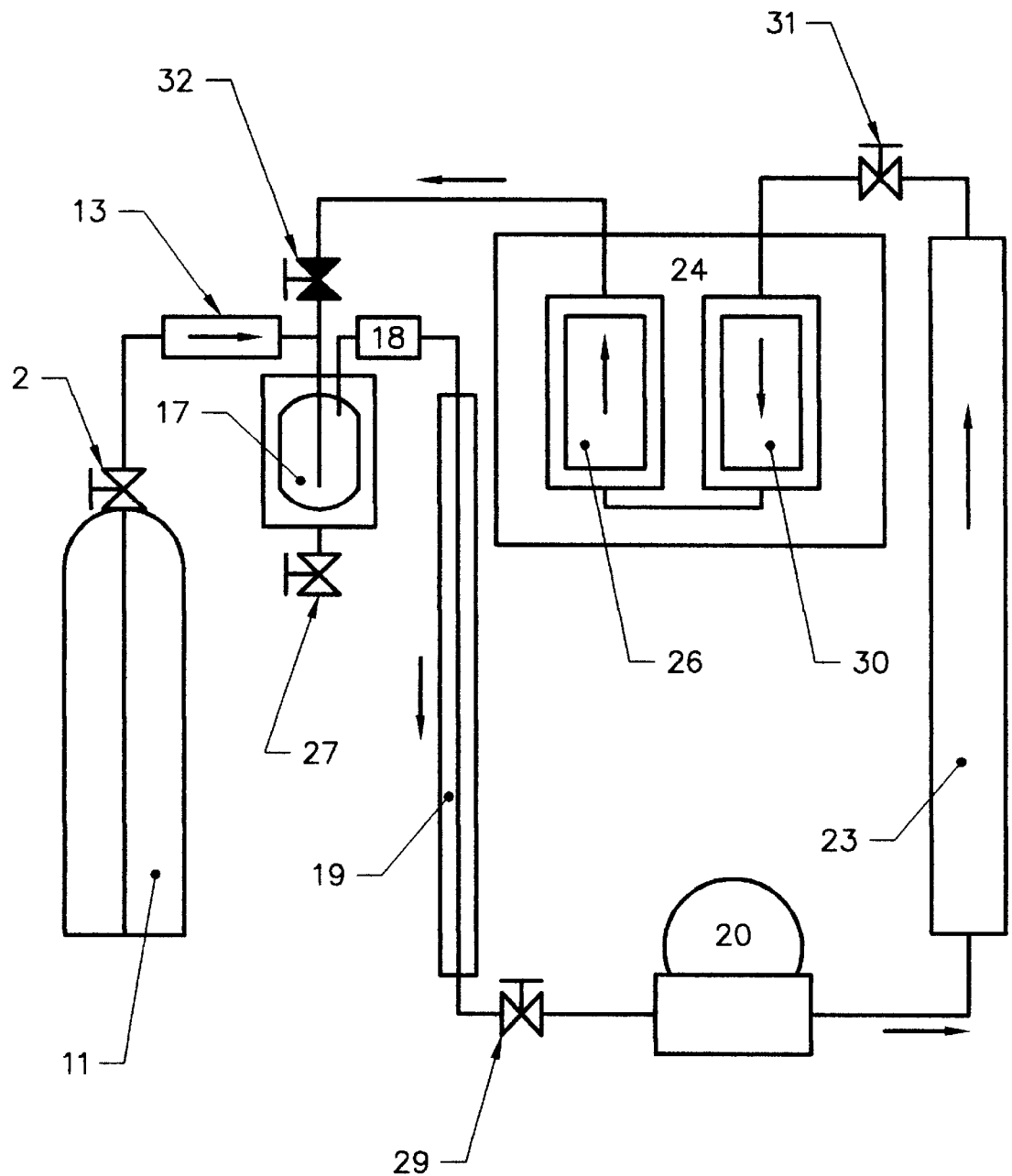
FIG. 6 is a schematic illustration of a closed loop supercritical fluid carbon dioxide extractor apparatus.

The extraction of TNT from Comp B high explosive can also be accomplished using the closed loop system shown in FIG. 6. Liquid carbon dioxide is charged into the system from tank 11 through check valve 13.

Carbon dioxide flowing from separator vessel 17 is passed through a 2 micron filter to remove any nucleated particulate matter, and is chilled in heat exchanger 19. The carbon dioxide is brought to pressure using pump 20. Surge tank 23 is used to minimize pressure fluctuations. The carbon dioxide is brought to temperature in preheater vessel 30 and flowed through extraction vessel 26

The carbon dioxide is expanded across flow restrictor 32, and the extracted material is collected in high pressure separator vessel 17. The extracted material is removed through drain valve 27. Isolation valves, e.g., 29 are used during the system start up to sequentially fill the extractor with carbon dioxide, or to maintain carbon dioxide in the surge tank between extraction runs when the samples are changed, A second valve can be paired with drain valve 27 to act as a pressure lock for perodical removal of nucleated material within a given extraction run.

EXAMPLE 4

Figure 7:
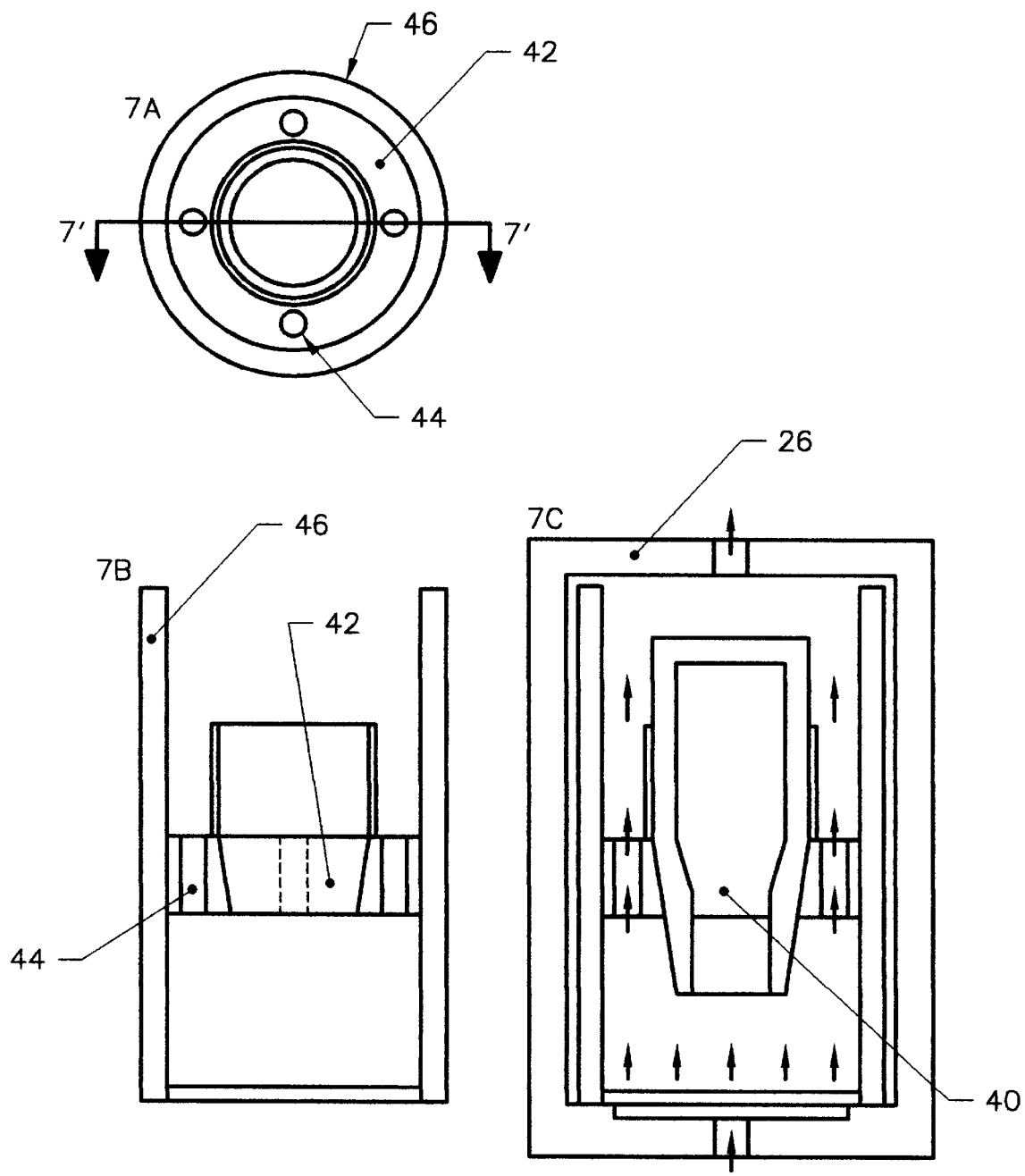
FIG. 7A is a plan view of a holder and basket means of a system used to extract TNT—based explosives from a war head projectile.
FIG. 7B is a cross-sectional view through 7'—7'of FIG. 7A.
FIG. 7C is a schematic of the system showing the extraction of a projectile.

The removal of a High Explosive from a projectile by melting is combined with supercritical fluid extraction in a single operation as shown in FIGS. 7A, 7B, and 7C. In operation, projectile(40) containing an explosive is secured in an extraction vessel in an inverted position and the process temperature is kept above the melting point of TNT. The TNT melts out of the projectile and settles to the bottom of the vessel.

Referring to Fig. 7B of the drawings, the system comprises projectile holder 42 having channels 44 having a liner basket 46. Projectile 40 is positioned in an inverted position in the liner basket, and the assembly is positioned in extraction vessel 26. Supercritical fluid is passed through the liner basket, while containing any molten or crystalline material which is removed from the projectile.

The lower surface of the liner basket consists of a filter frit or replaceable filter disk (not shown) which is designed to allow carbon dioxide to flow into the basket, while containing any molten or crystalline material that is removed from the projectile. The pore size should be around 20 microm to contain recovered nitramine material.

The combination of melting and extraction of TNT is applicable to the treatment of such High Explosives as Comp B (RDX/TNT/wax), Comp B3 and Cyclotol (RDX/TNT), Octol (HMX/TNT) Tritonal (TNT/aluminum), and Torpex (TNT/RDX/aluminum), as well as for the removal of neat TNT from warhead projectiles.

Having described my invention, I claim:

1. A method for the extraction of TNT from a high explosive comprising the steps of:

selecting a TNT containing a high explosive, loading the high explosive into a loading chamber, contacting the high explosive with a supercritical fluid at a temperature above the melting point of TNT and at a pressure sufficient to extract the TNT.

2. A method in accordance with claim 1, wherein the high explosive is selected from the group consisting of Co map B; Comp B3; Cyclotol; Octol; Tritonal; and Torpex.

3. A method in accordance with claim 2 wherein the super-critical fluid is carbon dioxide.

4. A method in accordance with claim 3 wherein the process is carried out at a temperature of about 85 degrees C and a pressure of about 37.4 MPa.

5. A method in accordance with claim 2, wherein high explosive is Comp B.

6. A method for extraction of TNT from a high explosive contained in a warhead comprising the steps of:

selecting a warhead having encased therein a high explosive containing TNT, securing the warhead in holding means, positioning the secured warhead in an inverted position in a extraction chamber, contacting the explosive through channels with a supercritical fluid at a temperature above the melting point of the TNT and sufficient pressure to extract the TNT.

7. A method in accordance with claim 6, wherein the high explosive is selected from the group consisting of Comp B, Comp B3, Cyclotol, Octol, Tritonal, and Torpex, and neat TNT, itself.

8. A method in accordance with claim 7, wherein the method is carried out at a temperature of about 85 degrees C, and a pressures of about 37.4 MPa.

* * * * *